No. 649,311. Patented May 8, 1900.
J. O. INGEBRETSON.
SELF DROPPING MECHANISM FOR SELF BINDING HARVESTERS.
(Application filed Feb. 15, 1900.)
(No Model.) 2 Sheets—Sheet 2.
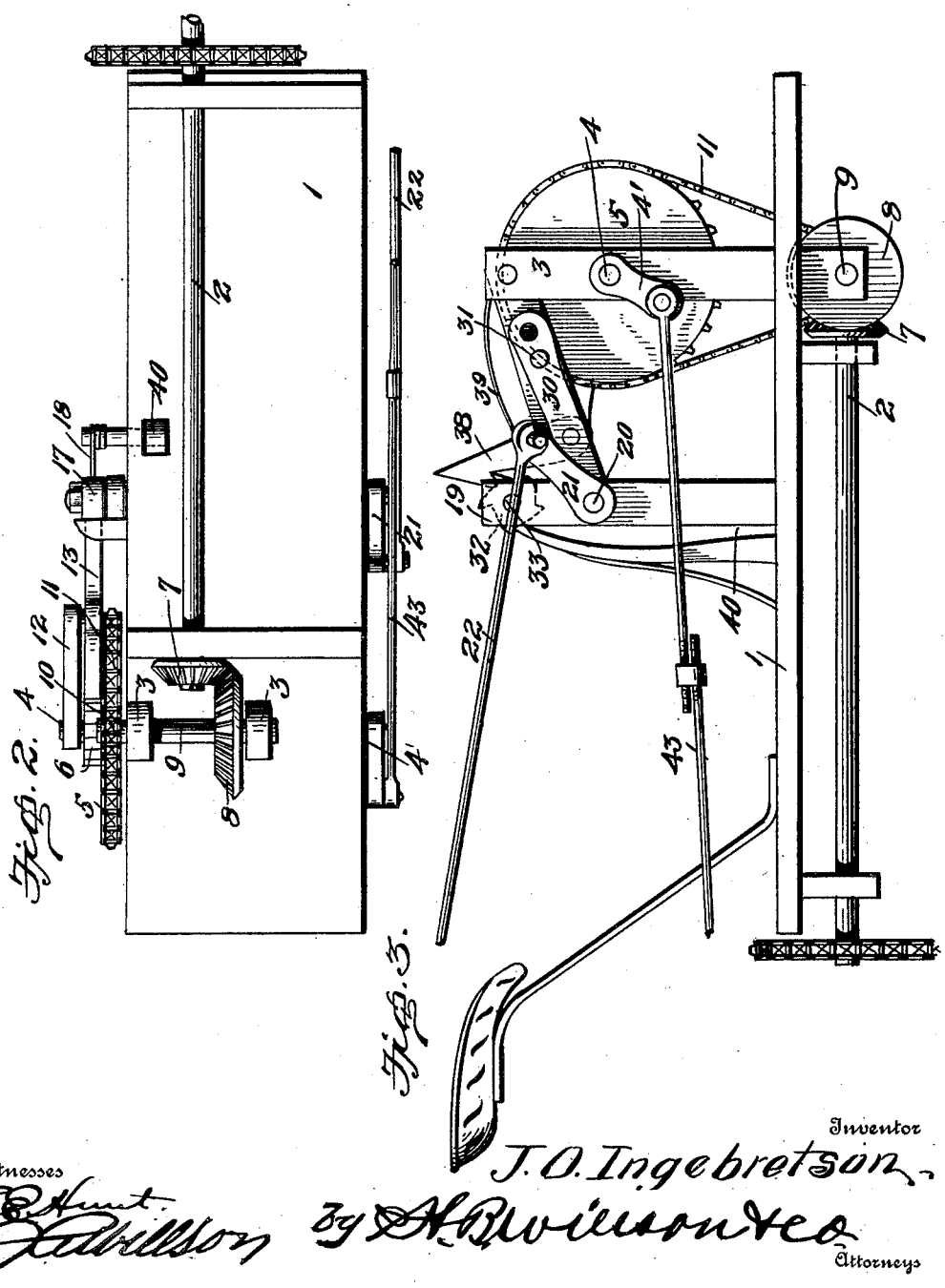
Witnesses
Inventor
J. O. Ingebretson
by H. B. Willson &co.
Attorneys

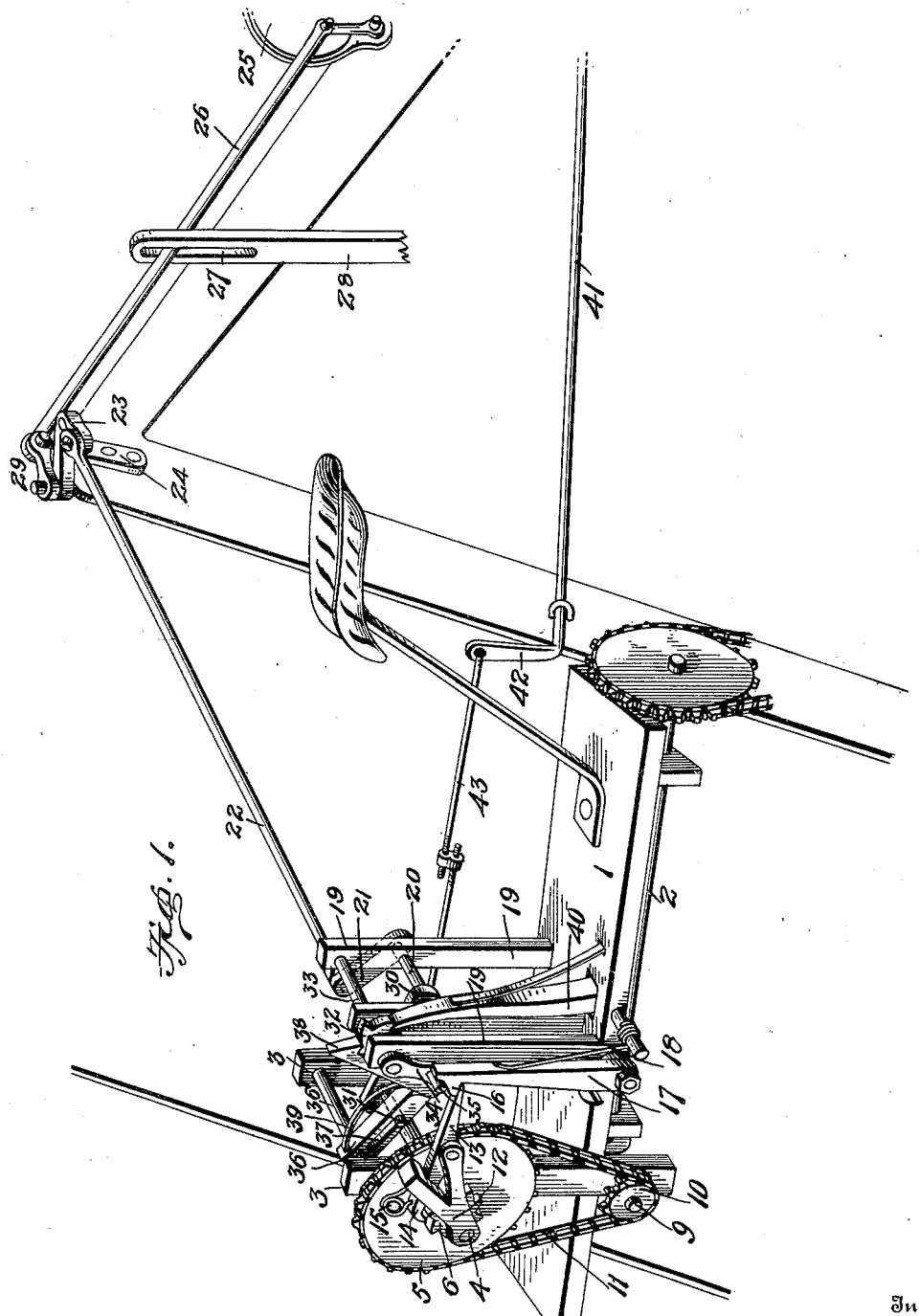

UNITED STATES PATENT OFFICE.

JOHN O. INGEBRETSON, OF MOE, SOUTH DAKOTA.

SELF-DROPPING MECHANISM FOR SELF-BINDING HARVESTERS.

SPECIFICATION forming part of Letters Patent No. 649,311, dated May 8, 1900.

Application filed February 15, 1900. Serial No. 5,277. (No model.)

*To all whom it may concern:*

Be it known that I, JOHN O. INGEBRETSON, a citizen of the United States, residing at Moe, in the county of Lincoln and State of South Dakota, have invented certain new and useful Improvements in Self-Dropping Mechanisms for Self-Binding Harvesters; and I do declare the following to be a full, clear, and exact description of the invention, such as will enable others skilled in the art to which it appertains to make and use the same.

The invention relates to improved self-dropping mechanism for self-binding harvesters.

The object of the invention is to provide simple, durable, and comparatively-inexpensive dropping mechanism that will automatically drop the bundle-carrier when a given number of bundles have been delivered to said carrier.

To this end the invention consists in certain features of construction and combination of parts, which will be hereinafter fully described and claimed.

In the accompanying drawings, Figure 1 is a perspective view of my improved mechanism for operating the bundle-carrier. Fig. 2 is a bottom plan view, and Fig. 3 is a side elevation.

In the drawings the same reference characters indicate the same parts of the invention.

1 denotes a part of the frame of a self-binding harvester.

2 denotes a drive-shaft which receives its power from any suitable source, preferably from some driven part of the harvester.

3 denotes the vertical standards, secured to the frame 2, and 4 denotes a shaft journaled between said standards and having loosely mounted upon one end a sprocket-wheel 5, to which is fixed or cast integral therewith a ratchet-wheel 6. The inner end of this shaft is provided with a crank 4'. The shaft 2 is provided with a bevel-pinion 7 at one end, which meshes with a bevel-gear 8, fixed to a transverse shaft 9, journaled in the lower ends of the posts or standards 3 and provided with a sprocket-wheel 10, which is connected with the sprocket-wheel 5 by a sprocket-chain 11.

Fixed to the outer end of the shaft 4 is a block 12, to which is pivoted a pawl 13, the toe 14 of which is adapted to be held into engagement with the ratchet-wheel by the spring 15 when its outer end is released. The outer end of the pawl is engaged by the bill 16 of a pivoted lever 17, which is held in engagement with the end of the pawl by the spring 18.

19 denotes a second set of standards mounted upon the frame 1, and in these standards is journaled a rock-shaft 20, having at its outer end a crank-arm 21, which is connected by a link 22 to a bell-crank lever 23. This bell-crank lever is pivoted to a bracket 24, supported by an upright portion of the harvester-frame, and is connected to a bundle-former (conventionally shown at 25) by a rod 26, which passes through a guide-slot 27 in the standard 28 of the harvester-frame and has its end pivoted to a toggle-arm 29, which is pivoted to the bell-crank lever 23. The shaft 20 is provided with an additional crank-arm 30, which is provided with a laterally-projecting pin 31.

32 denotes the trip-wheel, which is fixed to a shaft 33, journaled in the standards 19. One end of the shaft is provided with a trip-head 34, the pin 35 of which is adapted to engage the upper end of the lever 17 after the shaft has made a complete rotation and released the bill of said lever from engagement with the pawl 13. The trip-wheel is provided with ratchet-teeth which correspond in number to the number of bundles desired to be discharged at one time from the bundle-dropper. In the present instance I have shown five teeth, and it follows that when five bundles have been deposited upon the bundle-carrier said carrier may be operated to discharge the bundles therefrom.

36 denotes an arm pivoted to a rod 36', mounted in the upper ends of the standards 3 and provided with a longitudinal slot 37, through which the pin 31 of the crank-arm 30 projects. The free end of the arm 36 is provided with a pawl 38, which is held pressed against the trip-wheel 32 by a spring 39.

40 denotes a spring-actuated pawl which engages the trip-wheel and prevents it rotating backward.

41 denotes the bundle-dropper-operating arm, which is provided with a crank 42, which is connected to the crank-arm 4' by a two-part adjustable link 43.

The operation of the machine is as follows:

Assuming the parts to be in the position shown in Fig. 1 and the bundle-dropper (not shown) supporting four bundles, in this position the pin of the trip-head 34 is in engagement with the upper end of the lever 17, which is holding the toe of the pawl from engagement with the ratchet-wheel 6, thereby permitting the wheel 5 to rotate without affecting any of the parts. The instant the fifth bundle has been formed by the bundle-former 25 said former, through its intermediate connections, causes the shaft 20 to be rocked. This movement of the shaft depresses the free end of the crank-arm 30, which being connected by a pin and slot to the crank-arm 36 depresses the free end of said arm and causes the pawl 38 to be drawn downward, thus rotating the trip-wheel 32 the distance of one tooth and throwing the pin of the trip-head out of engagement with the pawl 13, thus permitting the spring 15 to act and force the toe of the pawl into engagement with the ratchet 6, thus locking the shaft 4 to the wheel 5 and causing the rotation of said shaft, this shaft being provided with the crank-arm 4', which being connected by the link 43 to the bundle-dropper-rod 41 operates said dropper to discharge the five bundles therefrom. In making its complete revolution the pawl 13 will engage the bill of the lever 17, which is in its track of movement, and will disengage the toe of the pawl from the ratchet-wheel, thus permitting the wheel 5 to freely rotate upon said shaft without rotating the same. This shaft now remains idle until there has been placed upon the bundle-dropper the desired number of bundles. When this has been done, the operation just described is repeated and the bundles discharged from said dropper. It is of course understood that as each bundle is formed and delivered to the dropper the dropper-wheel is rotated the distance of one tooth, so that when the fifth bundle has been deposited upon the dropper the pin of the dropper-head 34 will engage the lever 17, release it from the pawl 13, and allow the pawl 13 to engage the ratchet 6 and lock the wheel 5 to the shaft 4.

From the foregoing description, taken in connection with the accompanying drawings, the construction, operation, and advantages of my improved self-dropping mechanism will be readily apparent without requiring an extended explanation. It will be seen that the device is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus described the invention, what is claimed, and desired to be secured by Letters Patent, is—

Mechanism for actuating a bundle-dropper for harvesters comprising in combination a constantly-driven gear-wheel loosely mounted upon a shaft, a connection between the shaft and the bundle-dropper, a trip-wheel, a trip-head actuated by said trip-wheel, a rock-shaft, a crank-arm carried by said rock-shaft, a second crank-arm, one crank-arm being provided with a pin and the other with a pin-receiving slot, a spring-actuated pawl pivoted to one crank-arm and adapted to engage the trip-wheel, a connection between the rock-shaft and the bundle-former whereby said rock-shaft is actuated by the formation of a bundle and through the intermediate mechanism the trip-wheel is rotated tooth by tooth, means for locking the constantly-driven wheel to its shaft, a trip-lever adapted to hold the locking means in unlocked position, said trip-lever being in the path of movement of the trip-head and adapted to be moved to release it from the locking means, substantially as and for the purpose set forth.

In testimony whereof I have hereunto set my hand in presence of two subscribing witnesses.

JOHN O. INGEBRETSON.

Witnesses:
C. O. KNUDSON,
ASA FORREST, Jr.